Figure 1:
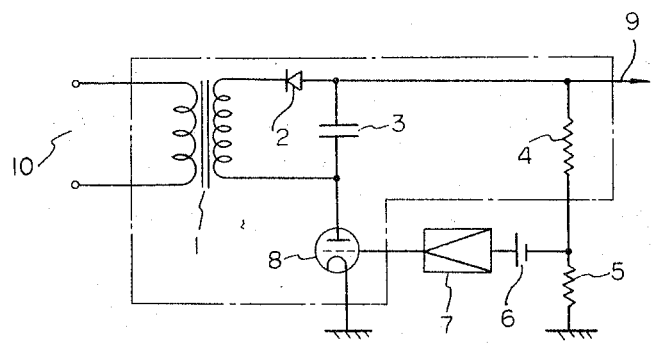

INVENTORS
YOSHIHARU UTSUMI
KIYOTERU TOKUYASU
KUNIJI YONETA

BY: Paul M. Craig, Jr.

ATTORNEY 3,268,797
DIRECT CURRENT HIGH VOLTAGE POWER SUPPLY
Yoshiharu Utsumi, Kiyoteru Tokuyasu, and Kuniji Yoneta, Katsuta-shi, Ibaragi, Japan, assignors to Hitachi, Ltd., Tokyo, Japan, a corporation of Japan
Filed Feb. 19, 1963, Ser. No. 259,652
Claims priority, application Japan, Feb. 22, 1962, 37/6,044; Apr. 6, 1962, 37/13,142
12 Claims. (Cl. 323—22)

The present invention relates to a direct-current high-voltage generating system providing, for example, 50, 75 or 100 kv. accelerating voltage, and more particularly to a power supply for use with devices such as electron microscopes and electron beam diffracting devices or with other various particle accelerators and has for its object to provide a high-voltage generating system of the kind described which affords a high degree of stability of output or accelerating voltages.

Another object of the present invention is to provide a system of the type described which includes a resistor, the resistance value of which is highly stabilized.

In general, the stability of the electron-accelerating voltage in devices such as electron microscopes and electron beam diffracting devices is an important factor which governs the characteristics of such devices, and this necessitates a power supply which can provide extremely stable voltages. To meet this requirement, various forms of generating apparatus have previously been proposed and put into practice. Among others, the so-called feedback type power supply is most widely used in which the high-voltage output is detected for comparison with a reference voltage and the differential voltage obtained is amplified and used to control the output voltage.

In the direct current high-voltage generators described, the variation in output voltage or accelerating voltage must be limited to the order of approximately $10^{-5}$ to $10^{-6}$ times the output voltage and many efforts have previously been made to obtain such highly stable output voltage, resulting in a number of proposals including the above-described negative feedback system, which is regarded as providing a considerably high degree of stability from the theoretical viewpoint. In practice, however, it has been difficult to obtain a highly stable voltage output with this circuit system.

According to the present invention, a direct-current high-voltage generating apparatus of the feedback type in which the rectified output voltage is detected by dividing means including a detecting resistance for comparison with a reference voltage and the differential voltage obtained is amplified to control a series connected variable impedance for providing a constant and stable output voltage is characterized in that said detecting resistance is housed so as to be isolated from the insulating medium surrounding the high-voltage generating part of the apparatus thereby to eliminate any disturbance to the output voltage thereof the apparatus from the high-voltage generating part.

Another object of the present invention is to provide the power supply stabilized by negative feedback with a stability of the output voltage of the order of $5 \times 10^{-6}$ or less.

These and other objects, features and advantages of the present invention will become apparent from the following description when taken in conjunction with the accompanying drawings, which illustrate a few embodiments of the invention and in which like references indicate like parts in several figures.

Figure 2:
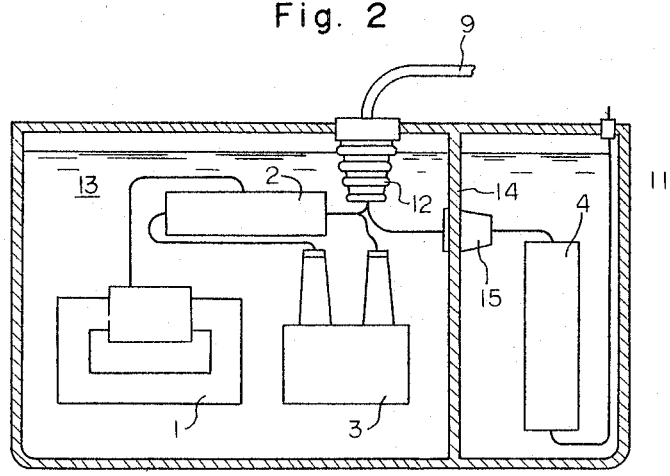
Figure 3:
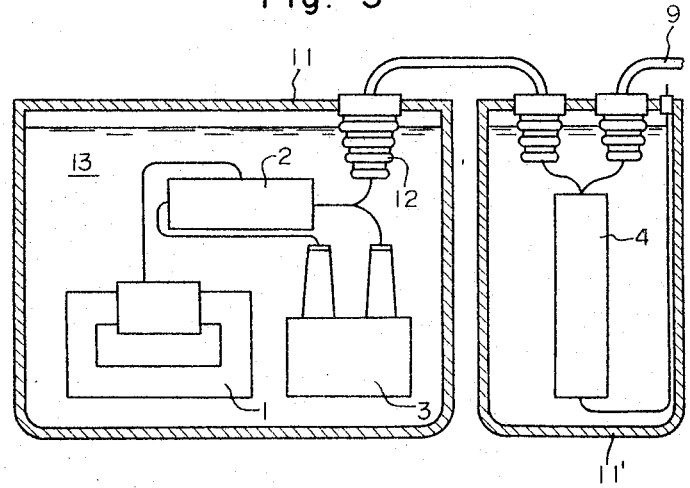
Figure 4:
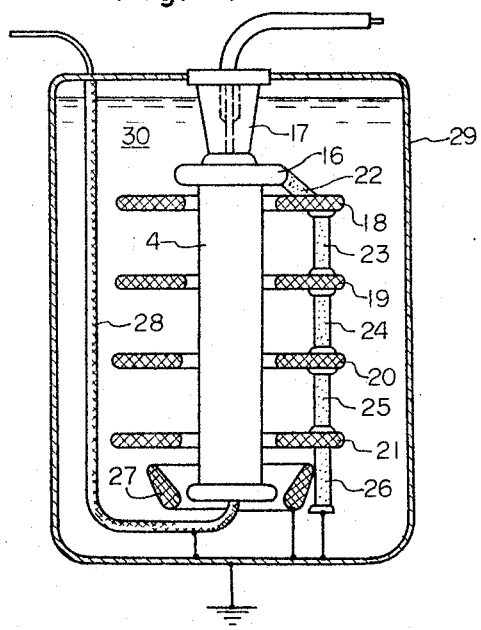

In the drawings:
FIG. 1 is a circuit diagram of one conventional power supply stabilized by negative feedback to which the present invention may be applied;

FIG. 2 is a vertical cross-sectional view of one embodiment of the invention;
FIG. 3 is a view similar to FIG. 2 illustrating another embodiment of the invention; and
FIG. 4 is a vertical cross-sectional view of the high-voltage detecting resistance device.

Referring to the drawings and particularly to FIG. 1, the circuit shown includes a step-up transformer 1, a rectifier 2 and a capacitor 3; these circuit elements cooperate, when an alternating-current source voltage is impressed across the input terminals 10 of the circuit, to produce a stepped-up direct-current voltage at the output terminal 9. A detecting resistance 4–5 is arranged to detect the output voltage and the differential voltage between the output and a standard battery 6 as a reference is amplified by an error amplifier 7 series-connected with the battery. A vacuum tube 8 is connected between the capacitor 3 and ground, as illustrated, and the amplified differential voltage is applied onto the grid of the tube 8 to vary the internal resistance thereof, thereby to maintain a definite level of voltage at the output terminal.

With this arrangement, the output voltage, produced at the output terminal 9, can be maintained substantially constant irrespective of any variation in the source voltage and the load imposed. On this occasion, the stability, $\Delta V_o/V_o$, of the output voltage is expressed by the following formula:

$$\frac{\Delta V_o}{V_o} = \frac{1}{1+G} \cdot \frac{\Delta V_i}{V_i} + \frac{G}{1+G} \left( \frac{\Delta V_s}{V_s} + \frac{\Delta r}{r} + \frac{\Delta V_a}{V_s} \right) \quad (1)$$

Where $V_o$ represents the output voltage, $\Delta V_o$, the variation of the output voltage; $V_i$, the input voltage, $\Delta V_i$, the variation of the input voltage; $V_s$, the reference voltage; $\Delta V_s$, the variation in the reference voltage; $r$, the division ratio between detecting resistances 4 and 5; $\Delta r$, the variation in this ratio; $\Delta V_a$, the voltage variation across the combination of amplifier 7 and controlling tube 8 based upon the amplifier input; and G, the loop gain of the apparatus, and thought as the product of the division ratio, $r$, and the gain of the amplifier-controlling tube combination 7–8. In this formula, the variation in load current is neglected for simplicity's sake.

The first term in the right side of the Formula 1 may be minimized by sufficiently increasing G, but on this occasion the second term is simultaneously increased to such an extent that the variation in the output voltage is substantially directly proportional to the sum of the rates of variation, $\Delta V_s/V_s$, $\Delta r/r$ and $\Delta V_a/V_s$.

Two of these rates of variation, $\Delta V_s/V_s$ and $\Delta V_a/V_s$, may be minimized by selecting a standard battery and an amplifier both of high accuracy. It is not so difficult with a conventional standard battery to obtain a stability of the order of $10^{-6}$ or less. It is also not so difficult at present to obtain an amplifier and a controlling tube having a stability of the order of $10^{-6}$ or less.

However, though the variation in the division ratio, $\Delta r/r$, due to variation in the detecting resistance 4–5 appears to be small, it has been found that it forms one of the most important factors to be considered in a designing a direct-current high-voltage power supply.

In previous power supplies of the kind described, a single oil tank as a casing for accommodating the essential components of the apparatus for the purpose of making the entire structure compact has been used, and the oil tank has never been divided into two or more compartments. Accordingly, in previous power supplies elements of the main circuit such as a step-up transformer, a rectifier, a capacitor and a high-voltage detecting resistance have been dipped in a single oil tank with the result that oil currents are formed in the tank by the Coulomb force between these main-circuit components and the grounded parts of the apparatus. The oil thus flowing in the vicinity of the components held at high voltage is electrically charged to carry the electricity with it. Movement of electric charge is also caused by the oil currents due to heat generation in the components held at high voltage. In previous kind described, the high-voltage side detecting resistance is arranged in the range of movement of the charged oil, thus a noise current is naturally caused to flow through the detecting resistance to produce a variation in the division ratio, $\Delta r/r$. The result is the same even if the resistance element is wrapped with an appropriate insulating material since the electrostatic induction always acts to cause some electric charge to flow into the resistance.

The occurrence of the above-described phenomenon is also apparent from the fact that electric charge is accumulated on a Faraday box placed in insulating oil to which a high voltage is impressed.

Moreover, the above phenomenon is promoted by the fact that electric charges may also be carried by minute particles of the dust or other foreign matter frequently occurring in the insulating oil.

The movement of electric charge as described above has not been recognized as a problem since previous power supplies did not require an extremely high stability, but is an extremely important problem with high-stability power sources with which the present invention is concerned. To cite a numerical example, the current flowing through a detecting resistance of 1,000 megohms used with an output voltage of 100 kilovolts amounts to 100 $\mu$a. In this case, if a noise current equivalent to 1 m$\mu$a. of the resistor current be formed through the resistance, a variation in the output of the order of $10^{-5}$ will result.

In addition, it is desirable to separate the high-voltage detecting resistance 4 from the high-voltage generating circuit, which generally involves a substantial heat generation, for the purpose of avoiding any temperature change in the resistor.

To deal with the above-mentioned defects, according to the present invention, the high-voltage detecting resistance 4 is accommodated in a separate casing, as illustrated in FIGS. 2, 3 and 4.

In one embodiment of the invention, shown in FIG. 2, a grounded casing 11 is divided by a partition 14 into two compartments. Accommodated in one of the compartments are components for generating high direct-current voltages including a step-up transformer 1, a rectifier 2 and a capacitor 3 while a high-voltage detecting resistance 4 is accommodated in the other compartment. Reference numeral 9 designates an output terminal; 12, 15 bushings; and 13 insulating oil filled in the casing 11. In a modification shown in FIG. 3, a grounded tank 11' is arranged separate from the main casing 11, which accommodates major high-voltage components, to house the high-voltage detecting resistance 4.

In these arrangements, it will be appreciated that the electric charge, which is carried by oil currents caused by the rectifier 2 and other major circuit components is conducted through the casing to the ground but not transferred to the detecting resistance 4 so that any disturbance to the system is substantially eliminated. Particularly, in case the high-voltage detecting resistance 4 is housed by itself in a separate casing, it is easy to control the temperature in the oil tank and also eliminate the variation of the resistance value due to the temperature change.

It will be apparent that the same result obtains even where the high-voltage detecting resistance is arranged in the same oil tank together with other circuit components including a rectifier as long as the resistance is isolated from the induction effect of oil currents thermally and otherwise caused by the other circuit components.

In a further form of detecting resistor shown in FIG. 4, the occurrence of oil currents is avoided by minimizing the strength of the electric field formed in the vicinity of the high-voltage detecting resistance with shielding means provided adjacent thereto to avoid any flow of voice current through the resistance in spite of the induction effect of the field. Reference numeral 29 indicates a grounded casing filled with insulating oil as indicated at 30 and accommodating the following circuit components. Reference numeral 16 is a ring formed of an electrically conductive material for reducing the strength of the electric field on the high-voltage side of the detecting resistance 4. Reference numeral 17 is a cable head for connecting the high voltage. Toroidal rings 18, 19, 20 and 21 formed of a conductive material are arranged to eliminate the formation of any intense electric field in the vicinity of the resistance 4 while taking up a noise current as described above and are held at respective appropriate potentials by means of a series of further resistances 22, 23, 24, 25 and 26, and one end of the resistance 26 is grounded. A guard ring 27 is arranged adjacent to the output of the high-voltage detecting resistance 4 and held at ground potential. Reference numeral 28 indicates a lead wire on the output side, which is shielded for the purpose of minimizing the adverse effect of the leakage current.

In the high-voltage detecting resistor arranged and constructed as described above, it will be appreciated that the strength of the electric field as well as the formation of oil currents in the vicinity of the resistance 4 is effectively reduced and that the noise current is conducted through shield rings 18, 19, 20 and 21 and/or the ground casing 29 so that the resistance 4 provides an output current which depends solely upon its own electric conductivity.

Also, it is desirable to use an insulating oil which is high in viscosity or low in fluidity and in which ions are not free to move, since the noise current is determined by such factors as the oil flow, the ion movement and the irregularity of such phenomena.

Previously, in devices such as high-voltage power supply of the kind described, it has been customary to employ insulating oil of a relatively low viscosity for the purpose of cooling as well as insulation and waterproofing.

With high-voltage detecting resistors of the kind described, however, cooling forms no important problem. To cite a numerical example, the thermal loss occuring in a detecting resistance of 1,000 megohms used in a power supply of 100 kilovolts output is as small as 10 watts. Even with such a limited thermal loss, any oil of high viscosity has not been used up to the present. The oil customarily used coresponds to either of Classes Nos. 1 to 4 are specified in the Japanese Industrial Standard for Oil, C-2320, having a viscosity at 30° C. of 23.0 centistokes (approximately 100 Redwood-seconds) or less.

It is preferable in carrying out the invention to employ an insulating oil of high viscosity, e.g. of 50 centistokes (approximately 200 Redwood-seconds) or over at 30° C. for the purpose of preventing the noise current, due to movement of electric charges and dust particles in the oil, from producing any drift or variation in the high-voltage output. Alternatively, insulating oil mixed with an appropriate amount of compound such as Microcrystal of the solid insulator to obtain a desired high viscosity may be employed to prevent such movement of electric charges.

As a further alternative, only the resistance element 4 may be sealed separate from the essential components of the apparatus, in a vacuum or in an insulating gas which carries only a limited electric charge.

In any of the embodiments described, it has been found that a direct-current high-voltage power supply of 100 kilovolts output conventionally having a voltage variation of the order of $2\times10^{-5}$ to $5\times10^{-5}$ can be improved by the application of the present invention to have a voltage variation of as little as $5\times10^{-6}$ or less.

Through only a few embodiments of the invention have been shown and described herein, it will be apparent to those skilled in the art that various changes and modifications may be made without departing from the scope of the invention as defined in the appended claims.

What is claimed is:

1. In a direct-current high-voltage generating apparatus of the feedback type in which the output voltage is detected by dividing means including a detecting resistance for comparison with a reference voltage and the differential voltage obtained is amplified to control a controlling part for providing a constant and stable output voltage, the improvement essentially consisting of housing means for arranging said detecting resistance in a circumstance inaccessible to the insulating medium surrounding the high-voltage generating part of the apparatus thereby to eliminate any disturbance to the output thereof from the high-voltage generating part.

2. In a direct-current high-voltage generating apparatus of the feedback type enclosed in a casing in which the output voltage is detected by dividing means including a reference resistance for comparison with a reference voltage and the differential voltage obtained is amplified to control a controlling part for providing a constant and stable output voltage, the improvement essentially consisting of housing means enclosing said detecting resistance in a grounded casing arranged separate from the casing housing the high-voltage generating part thereby to eliminate any disturbance to the output of the apparatus from the high-voltage generating part.

3. In a direct-current high-voltage generating apparatus of the feedback type in which the output voltage is detected by dividing means including a detecting resistance for comparison with a reference voltage and the differential voltage obtained is amplified to control a controlling part for providing a constant and stable output voltage, the invention essentially consisting of a plurality of shielding conductors arranged in the vicinity of the detecting resistance and held at respective different voltages for the purpose of shielding the detecting resistance from the high-voltage generating part.

4. A direct-current high-voltage generating apparatus as defined in claim 1 in which said insulating medium is an insulating oil.

5. In a direct-current high-voltage generating apparatus of the feedback type in which the output voltage is detected by dividing means including a detecting resistance for comparison with a reference voltage and the differential voltage obtained is amplified to control a controlling part for providing a constant and stable output voltage, characterized in that said reference resistance is immersed in an insulating oil having an extremely high viscosity.

6. A direct-current high-voltage generating apparatus as defined in claim 1 in which said detecting resistance is sealed in a vacuum casing.

7. A direct-current high-voltage generating apparatus as defined in claim 5 in which the insulating oil has a viscosity of at least 200 Redwood-seconds at the temperature of 30° C.

8. In a direct current high voltage generating system of the feedback type having a voltage divider means including a detecting resistance for detecting the magnitude of the output voltage, reference voltage means for producing a differential voltage upon comparison with said detected output voltage and electrically controlled means for controlling the magnitude of the output voltage in response to said differential voltage, the improvement essentially consisting of housing means isolating said voltage divider means from the insulating medium surrounding the remainder of said voltage generating system so as to render said voltage divider means inert to indirect influence from said system.

9. In a direct current high voltage generating system of the feedback type having voltage divider means including a detecting resistance for detecting the magnitude of the output voltage, reference voltage means for producing a differential voltage upon comparison with said detected output voltage and electrically controlled means for controlling the magnitude of the output voltage in response to said differential voltage, the improvement essentially consisting of housing means isolating said voltage divider means from the insulating medium surrounding the remainder of said voltage generating system so as to render said voltage divider means inert to indirect influence from said system,
said housing means consisting of a grounded casing of electrically conductive material.

10. In a direct current high voltage generating system of the feedback type having voltage divider means including a detecting resistance for detecting the magnitude of the output voltage, reference voltage means for producing a differential voltage upon comparison with said detected output voltage and electrically controlled means for controlling the magnitude of the output voltage in response to said differential voltage, the improvement essentially consisting of housing means isolating said voltage divider means from the insulating medium surrounding the remainder of said voltage generating system so as to render said voltage divider means inert to indirect influence from said system,
said housing means being filled with an insulating oil having an extremely high viscosity sufficient to prevent the formation of oil currents.

11. In a direct current high voltage generating system of the feedback type having voltage divider means including a detecting resistance for detecting the magnitude of the output voltage, reference voltage means for producing a differential voltage upon comparison with said detected output voltage and electrically controlled means for controlling the magnitude of the output voltage in response to said differential voltage, the improvement essentially consisting of housing means isolating said voltage divider means from the insulating medium surrounding the remainder of said voltage generating system so as to render said voltage divider means inert to indirect influence from said system,
said housing means being filled with an insulating oil having an extremely high viscosity sufficient to prevent the formation of oil currents,
said insulating oil having a viscosity of at least 200 Redwood-seconds at a temperature of 30° C.

12. In combination with a direct current high voltage generating system, a voltage regulating means having voltage divider means connected to the output of said voltage generating system, reference voltage means providing a stable reference voltage, means deriving a control signal through comparison of said reference voltage with a voltage from said voltage divider means, electrically controlled variable impedance means connected to said voltage generating system for regulating the voltage generated thereby in response to said control signal, the improvement essentially consisting of first oil filled housing means enclosing said voltage generating system, reference voltage means, means deriving a control signal and said electrically controlled variable impedance means, and second oil filled housing means enclosing said voltage divider means and isolating said voltage divider means from the medium surrounding the remainder of said voltage generating system.

References Cited by the Examiner
UNITED STATES PATENTS

| | | | |
|---|---|---|---|
| 1,897,337 | 2/1933 | Scofield | 174—35.4 |
| 1,941,463 | 1/1934 | Burnham | 174—17.12 |
| 2,140,707 | 12/1938 | Lee | 174—17.05 |
| 2,940,033 | 6/1960 | McConnell et al. | 322—36 |
| 3,129,396 | 4/1964 | Germain et al. | 174—52 |

JOHN F. COUCH, *Primary Examiner.*

LLOYD McCOLLUM, *Examiner.*

D. L. RAE, K. D. MOORE, *Assistant Examiners.*